Figure 1:
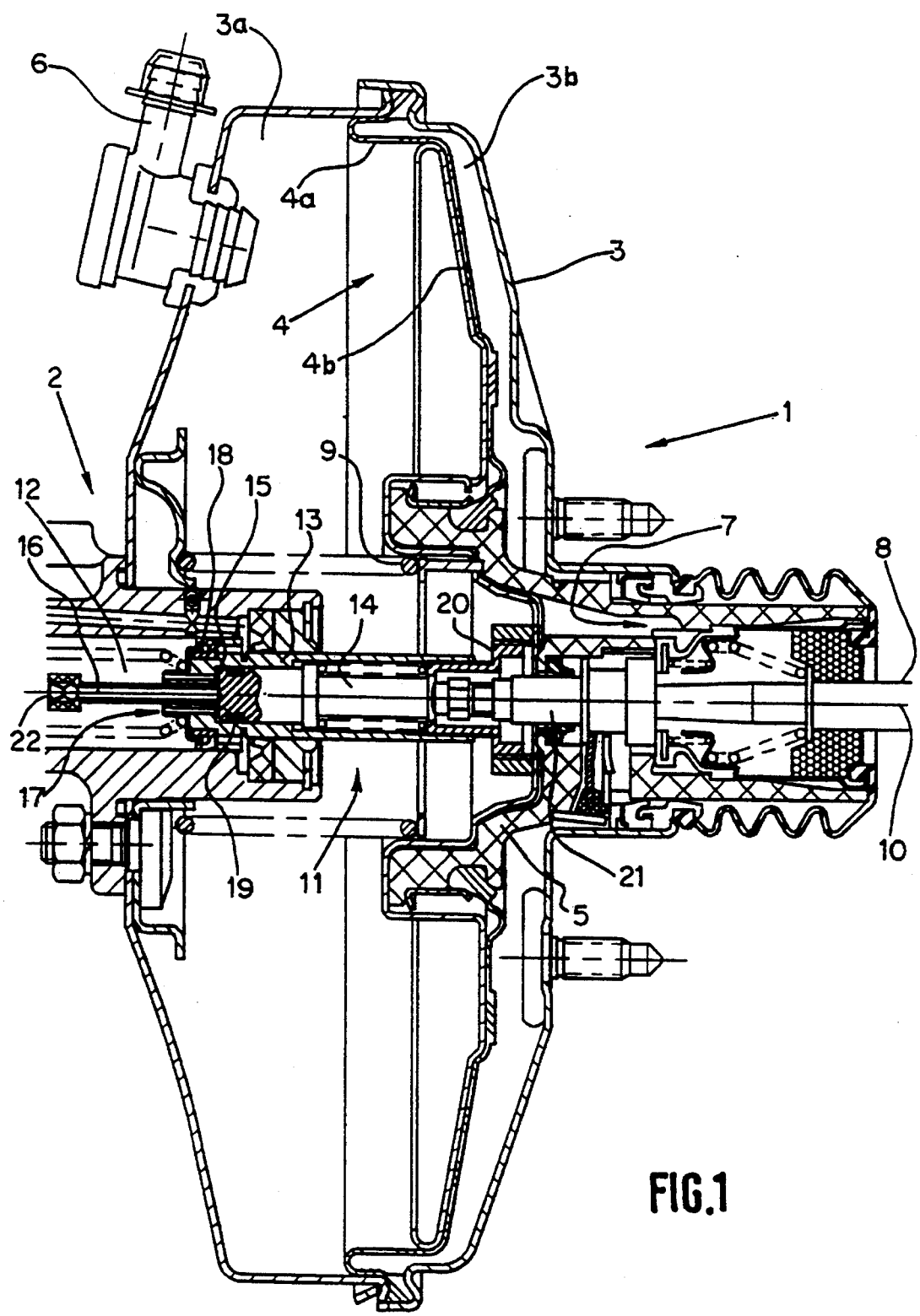

United States Patent [19]

Gautier et al.

[11] Patent Number: 5,475,977
[45] Date of Patent: Dec. 19, 1995

[54] BRAKE-BOOSTER DEVICE WITH SLOWED HYDRAULIC REACTION

[75] Inventors: Jean Pierre Gautier; Ulysse Verbo, both of Aulnay-sous-Bois; Miguel Perez Revilla, Argenteuil; Roland Levrai, Stains, all of France

[73] Assignee: Allied Signal Europe Services Techniques, Drancy, France

[21] Appl. No.: 122,558

[22] PCT Filed: Sep. 22, 1993

[86] PCT No.: PCT/FR93/00914

§ 371 Date: Sep. 30, 1993

§ 102(e) Date: Sep. 30, 1993

[87] PCT Pub. No.: WO94/07722

PCT Pub. Date: Apr. 14, 1994

[30] Foreign Application Priority Data

Sep. 30, 1992 [FR] France ................................. 92 11625
Jan. 21, 1993 [FR] France ................................. 93 00571

[51] Int. Cl.⁶ ............................. B60T 13/00; F15B 9/10
[52] U.S. Cl. ...................... 60/547.1; 91/369.1; 91/376 R
[58] Field of Search ................................. 91/369.1, 369.2, 91/376 R; 60/547.1, 548, 555, 550; 92/98, 96, 98 R

[56] References Cited

U.S. PATENT DOCUMENTS 3,470,695 10/1969 Kilb .
4,012,080 3/1977 Engle .................................. 60/547.1 X
4,110,985 9/1978 Gordon et al. ............................ 60/548
4,195,484 4/1980 Mathues et al. ....................... 60/548 X

FOREIGN PATENT DOCUMENTS 0257360 8/1987 European Pat. Off. .
0337473 10/1989 European Pat. Off. .
2558126 1/1985 France .
44-22136 9/1969 Japan .................................... 60/550

*Primary Examiner*—Edward K. Look
*Assistant Examiner*—Hoang Nguyen
*Attorney, Agent, or Firm*—Larry J. Palguta; Leo H. McCormick, Jr.

[57] ABSTRACT

A brake actuation apparatus includes a pneumatic booster and a master cylinder. A control rod in the booster responds to an input force for actuating a valve in the brake booster to develop an actuation force which is applied to a main hydraulic piston located in the master cylinder to pressurize fluid and effect a brake application. The main hydraulic piston includes a cylinder member with a bore therein for retaining a secondary hydraulic piston connected to the control rod. The cylinder member has at least one opening whereby pressurized fluid is communicated between the master cylinder and bore as function of a flow-rate reducer located in the one opening. The communication of fluid between the master cylinder and bore is always from the higher fluid pressure toward the lower fluid pressure. The fluid pressure in the bore acts on the secondary hydraulic piston to oppose the input force and thereby modify the time the valve remains opened by the input force and correspondingly the development of the actuation force for the pressurizing of fluid in the master cylinder.

6 Claims, 2 Drawing Sheets

BRAKE-BOOSTER DEVICE WITH SLOWED HYDRAULIC REACTION

The present invention relates to a brake-booster device for a motor vehicle, comprising on the one hand a master cylinder filled with a brake fluid and fitted with a main hydraulic piston designed to receive an actuation force composed of an input force and of a boost force both acting in an axial direction, and on the other hand a pneumatic booster capable of being controlled by application of said input force on a control rod controlling the opening of a valve, so as to exert said actuation force on the main hydraulic piston, the booster comprising a rigid casing separated in a leak-tight manner into two chambers by means of at least one movable partition, capable of being acted upon by a pressure differential between the two chambers resulting from the opening of the valve and of driving a pneumatic piston, movable with respect to the casing, bearing said valve and contributing mat least to transmission of said boost force, the main hydraulic piston of the master cylinder itself comprising a hollow, movable cylinder receiving at leas part of the boost force, and inside which slides, in a leaktight manner and in the axial direction, a secondary hydraulic piston capable of receiving at least said input force.

A device of this type is well known in the prior art and is for example described in U.S. Pat. No. 4,491,058 or in the document FR-A-2 558 126.

Such a device, using a movable pneumatic piston, has the advantage of offering to the brake pedal a long travel when braking, which permits an optimal control of the deceleration of the vehicle.

However, the generalization of electronically controlled brake systems, designed to prevent locking of the wheels and/or wheelspin, is giving rise to new constraints on the response times of the mechanical and hydraulic subassembly, the electronic subassembly having, for its part, extremely short response times.

In this context, the invention has precisely the object of reducing the response time of a brake-booster device.

To this end, the device of the invention is essentially characterized in that at least one opening is made in the movable cylinder in order to place the interior of the latter in communication with the interior of the master cylinder, and in that a selective flow-rate reducer is provided in, this opening in order to oppose, in a circulation of brake fluid from the master cylinder to the movable cylinder, and a circulation in the reverse direction, respective first and second pressure drops, the first of which is greater than the second.

By virtue of this arrangement, the secondary hydraulic piston, during an abrupt braking action, receives the reaction of the internal pressure of the master cylinder only in a progressive and deferred manner.

The first result of this is that the control rod remains for a longer time in a position relatively advanced, in the direction of the master cylinder, compared with the pneumatic piston, which consequently permits the valve to remain more widely open for a longer time, and permits the boost force to become established more rapidly at a high value.

In an embodiment easy to implement, several openings are made in the movable cylinder and the selective flow-rate reducer is a non-return valve installed on at least one of these openings.

Preferably, the device further comprises a thrust rod of adjustable length disposed between the control rod and the secondary hydraulic piston.

Figure 2:
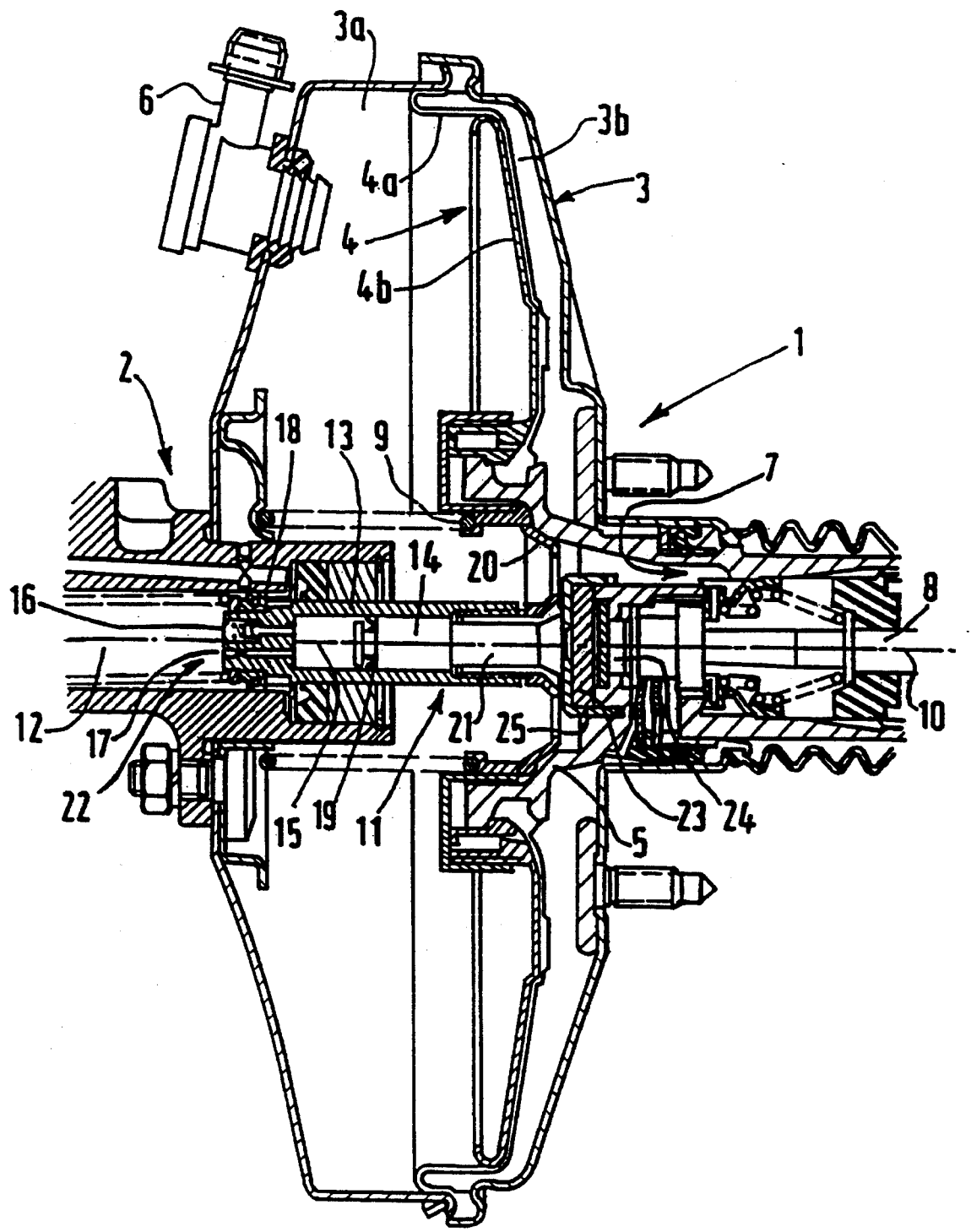

The invention will now be described by way of example with reference to the accompanying drawings in which:

FIG. 1 is a view in partial cross-section of a device according to an embodiment of the present invention, and FIG. 2 is a view in partial cross-section of a device according to a variant of the embodiment of FIG. 1.

Insofar as the invention relates only to an improvement made to pneumatic brake-booster systems, and insofar as the general constitution and the functioning of the latter are well known to the person skilled in the art, these systems will be rapidly recalled here only to permit a total comprehension of the improvement which the invention represents.

Diagrammatically, a system of this type comprises a booster 1 and a master cylinder 2.

The booster itself comprises a rigid casing 3 separated into two chambers 3a and 3b, in a leaktight manner, by a movable partition 4 comprising a membrane 4a and a rigid skirt 4b and capable of driving a pneumatic piston 5 movable inside the casing 3.

The front chamber 3a, the front face of which is closed in a leaktight manner by the master cylinder 2, is permanently connected to a partial vacuum source (not shown) through a non-return valve 6.

The pressure in the back chamber 3b is controlled by a valve 7, controlled by a control rod 8, which is connected to a brake pedal (not shown).

When the control rod 8 is in the resting position, in this case pulled to the right, the valve 7 establishes a communication between the two chambers 3a and 3b of the booster, or comes from a position in which this communication has been established.

The back chamber 3b then being subject to the same partial vacuum as the front chamber 3a, the piston 5 is pushed back to the right, in the resting position, by a spring 9.

The actuation of the control rod 8 towards the left has the effect, in a first stage, of moving the valve 7 so that it isolates the chambers 3a and 3b from one another and then, in a second stage, of moving this valve so that it opens the back chamber 3b to atmospheric pressure.

The pressure differential between the two chambers then sensed by the membrane 4a exerts on the movable partition 4 a thrust which tends to move it to the left and to permit it to drive the piston 5 which moves in turn compressing the spring 9.

The braking effort exerted on the control rod 8, or "input force" and the brake boost effort, or "boost force" resulting from the thrust of the movable partition 4, are then applied together along the axis 10 of the thrust rod 8 in the direction of the master cylinder 2, and combine to constitute the actuation force of the latter.

More precisely, the actuation force is applied on the main hydraulic piston 11 of the master cylinder and produces its movement to the left (in the FIG. 1), which leads to a rise in pressure of the brake fluid present in the internal volume 12 of the master cylinder, and an actuation of the brake connected to the latter.

The main hydraulic piston 11 is in fact composite and comprises on the one hand a movable and hollow cylinder 13, and on the other hand a secondary hydraulic piston 14.

The internal volume 15 of the movable cylinder 13 communicates with the internal volume 12 of the master cylinder through the intermediary of openings, such as 16 and 17, made in the movable cylinder in an axial direction.

Apart from the passage of fluid which these openings 16 and 17 permit between the internal volume 12 of the master cylinder 2 and that of the movable cylinder 13, this movable cylinder 13 slides in a leaktight manner in the master cylinder 2, the leaktightness being obtained by virtue at least of an annular seal 18.

The secondary hydraulic piston 14, for its part, slides inside the movable cylinder 13, which it closes in a leaktight manner by virtue of an annular seal 19.

The movable cylinder 13 is connected, through the bush 20, to the rigid skirt 4b so as to receive pan at least of the boost force exerted through the intermediary of this skirt.

The secondary hydraulic piston 14 is disposed axially, facing a thrust rod 21 capable of transmitting to it at least the input force exerted on the control rod 8.

The functioning of the device described hitherto is as follows.

When an input force is applied on the control rod 8, after a predetermined travel of the control or thrust rod 8, the valve 7 opens to the atmosphere the back chamber 3B of the booster, previously isolated from the front chamber 3a, and a boost force is applied to the movable cylinder 13 by the rigid skirt 4b through the bush 20.

The hydraulic pressure in the internal volume 12 of the master cylinder rises and becomes established, by circulation of hydraulic fluid through the openings 16 and 17, in the internal volume 15 of the movable cylinder, thus causing to appear, on the secondary hydraulic piston 14, a reaction force dependent on the boost force, opposing the input force, and therefore permitting the control of the first force by the second.

According to the invention, at least one of the openings 16 is provided with a selective flow-rate reducer 22 serving to inhibit the flow rate of hydraulic fluid liable to become established, from the internal volume 12 of the master cylinder to the internal volume 15 of the movable cylinder through the openings which place them in communication, in comparison with the flow rate It can be seen on FIG. 2 that the secondary hydraulic piston 14 in fact consists of the axial extension of a control or thrust rod 21 capable of transmitting to it, on the one hand, the input force exerted on the control rod 8 and, on the other hand, a fraction of the booster force developed by the pneumatic piston 5, these forces being transmitted, in a fashion known per se, by means of a reaction disk 23, on one face of which there bear this pneumatic piston and a feeler 24 which is actuated by the control rod, and whose other face bears on a cup 25 which is securely fastened to the control or thrust rod 21.

Upon actuation of the device, the hydraulic pressure in the internal volume 12 of the master cylinder clearly rises and becomes established, by a flow of hydraulic fluid through the passage 17, in the internal volume 15 of the movable cylinder, thus causing a reaction force to appear on the secondary hydraulic piston 14, depending on the boost force, opposing the force transmitted via the reaction disk 23, and allowing the booster force to be controlled by the input force.

As in the previous embodiment, the internal volume 15 of the movable cylinder communicates with the internal volume 12 of the master cylinder through a selective flow rate-reducer 22, made of for example a non-return valve disposed in the opening 16, and of a flow rate restrictor disposed in the opening 17.

In this way, as described above, in the case of abrupt braking, the circulation of hydraulic fluid from the volume 12 to the volume 15 is slowed down by the flow-rate restrictor in the opening 17, and the hydraulic reaction on the secondary piston 14 is delayed, which allows an improved response time. When the driver ends his braking action, the non return valve in the opening 16 opens and allows the different components of the booster and of the master cylinder to return rapidly in their rest position. of fluid liable to become established in the reverse direction, the first mentioned flow rate bringing about a pressure drop greater than that to which the second is subject.

According to an embodiment very simple to implement, the selective flow-rate reducer 22 is, as shown in FIGS. 1 and 2, constituted by a non-return valve installed on a least one of the openings 16, 17 and prohibiting the return of fluid to the movable cylinder issuing from the master cylinder through this opening.

By virtue of these features, the backward movement (towards the right in the FIG. 1) of the secondary hydraulic piston 14 in the movable cylinder 13 under the effect of the hydraulic reaction is less rapid and instantaneous than is the driving (towards the left) of this secondary hydraulic piston into the movable cylinder.

As a result of this, during braking, and particularly in the case of abrupt braking, the control rod 8 may be located, with respect to the pneumatic piston 5, therefore also with respect to the valve 7 which the latter bears, in a position driven further in (towards the left in the FIG. 1) and for a longer time, than in the devices of the prior art.

The valve 7 can therefore be opened wide in almost instantaneous manner and can remain there during the time required for the filling of the back chamber 3b, this time being moreover all the shorter for the fact that this valve, by virtue of the invention, can be wide open.

For this reason, it may be advantageous to provide for the thrust rod 21 to be adjustable in length, the adjustment of the latter permitting adjustment of the opening of the valve 7.

On FIG. 2 is shown a boosted device according to a variant of the embodiment described above with respect to FIG. 1. In this FIG. 2, the elements identical on analogous to those which has just been described above with respect to FIG. 1 are given the same reference signs.

We claim:

1. A brake actuation apparatus for a motor vehicle, comprising a master cylinder and a pneumatic booster, said master cylinder being filled with a brake fluid and fitted with a main hydraulic piston located in an interior of said master cylinder, said main hydraulic piston being designed to receive an actuation force composed of an input force and of a boost force both acting in an axial direction, said main hydraulic piston responding to said actuation force by moving to pressurize said brake fluid in said interior of said master cylinder, said pneumatic booster having a rigid casing separated in a leaktight manner into first and second chambers by means of at least one movable partition, said movable partition being connected to a pneumatic piston which retains a control valve, said control valve being responsive to said input force applied to a control rod for the development of a pressure differential between said first and second chambers, said pressure differential acting on and moving said movable partition with respect to said casing to create said boost force for driving said pneumatic piston through which said actuation force is communicated to said main hydraulic piston, said main hydraulic piston including a cylinder member with a bore therein and a secondary hydraulic piston which slides in a leaktight manner within said bore, said cylinder member receiving at least part of the boost force while said secondary hydraulic piston is capable of receiving at least said input force from said control rod, said main hydraulic piston being characterized in that at least one opening is made in said cylinder member for providing a flow communication connection between said bore and said interior of the master cylinder, and a selective flow-rate reducer located in said one opening to control circulation of pressurized brake fluid between said master cylinder and said bore, said circulation of pressurized fluid between said interior of said master cylinder and said bore being a function of a higher fluid pressure toward a lower fluid pressure, said fluid pressure in said bore opposing said input force to modify the operation of said valve by said input force during the development of said pressure differential in said pneumatic booster and the resulting actuation force.

2. The brake actuation apparatus according to claim 1, wherein said main hydraulic piston is further characterized by several openings in the cylinder member and said selective flow-rate reducer is a non-return valve installed in at least one of said several openings.

3. The brake actuation apparatus according to claim 2, further comprising an adjustable member located between said control rod and said secondary hydraulic piston for modifying the time said valve is opened in response to the input force applied to said control rod.

4. The brake actuation apparatus according to claim 1, further comprising a reaction disc in said pneumatic piston through which the input force and at least part of said actuation force is transmitted to said secondary hydraulic piston.

5. The brake actuation apparatus according to claim 4, wherein said main hydraulic piston is further characterized by several openings in the cylinder member and said selective flow-rate reducer is a non-return valve installed in at least one of said several openings.

6. The brake actuation apparatus according to claim 5, further comprising an adjustable member located between said control rod and said secondary hydraulic piston for modifying the time said valve is opened in response to the input force applied to said control rod.

* * * * *